(12) United States Patent
Bailey et al.

(10) Patent No.: US 11,812,451 B2
(45) Date of Patent: Nov. 7, 2023

(54) VEHICLE COMPONENT USAGE

(71) Applicant: Ford Global Technologies, LLC, Dearborn, MI (US)

(72) Inventors: Clifford Anthony Bailey, Canton, MI (US); Sujitha Krishna Devaraj, Troy, MI (US); Josh Fodale, Ypsilanti, MI (US); Robert Hinh, Cincinnati, OH (US); Adrian Kalinowski, Sterling Heights, MI (US); Rafi Odisho, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1068 days.

(21) Appl. No.: 16/452,169

(22) Filed: Jun. 25, 2019

(65) Prior Publication Data

US 2020/0413408 A1    Dec. 31, 2020

(51) Int. Cl.
*H04W 72/53*    (2023.01)
*H04L 12/40*    (2006.01)
*H04W 4/40*    (2018.01)
*H04L 9/06*    (2006.01)
*H04L 9/00*    (2022.01)

(52) U.S. Cl.
CPC .......... *H04W 72/53* (2023.01); *H04L 9/0643* (2013.01); *H04L 12/40* (2013.01); *H04W 4/40* (2018.02); *H04L 9/50* (2022.05); *H04L 2012/40215* (2013.01)

(58) Field of Classification Search
CPC ... H04W 72/0493; H04W 4/40; H04W 12/08; H04W 12/106; H04L 9/0643; H04L 12/40; H04L 2012/40215; H04L 2209/38; H04L 67/1097; H04L 67/12; H04L 9/3239; H04L 2209/84; H04L 63/10; H04L 9/3213; Y04S 40/18; B60R 16/023
See application file for complete search history.

(56) References Cited

U.S. PATENT DOCUMENTS

| | | | | |
|---|---|---|---|---|
| 8,215,546 | B2* | 7/2012 | Lin | G06Q 50/14 235/382 |
| 10,185,595 | B1* | 1/2019 | Ramatchandirane | H04L 9/3236 |
| 11,157,655 | B2* | 10/2021 | Bueno | H04L 9/3239 |
| 2013/0054282 | A1* | 2/2013 | Pinkus | G06Q 10/02 705/5 |
| 2015/0229572 | A1* | 8/2015 | Birlik | H04L 47/50 709/217 |
| 2015/0371204 | A1* | 12/2015 | Balda | G01S 19/14 705/13 |
| 2017/0017955 | A1* | 1/2017 | Stern | G06F 21/645 |

(Continued)

FOREIGN PATENT DOCUMENTS

| | | |
|---|---|---|
| CN | 108183959 A | 6/2018 |
| CN | 108492111 A | 9/2018 |
| CN | 108765591 A | 11/2018 |

*Primary Examiner* — Kodzovi Acolatse
*Assistant Examiner* — Anindita Sen
(74) *Attorney, Agent, or Firm* — Brandon Hicks; Bejin Bieneman PLC

(57) ABSTRACT

A method includes receiving a first data block including an identifier for a component, receiving a second data block including usage data for the component and a link to the first data block, storing the first and second data blocks in a blockchain, and allocating respective usage tokens to each of a plurality of entities based on the usage data.

18 Claims, 3 Drawing Sheets

(56) References Cited

U.S. PATENT DOCUMENTS

| | | | | |
|---|---|---|---|---|
| 2018/0293555 A1* | 10/2018 | Handoko | ............. | G06Q 20/401 |
| 2019/0334697 A1* | 10/2019 | Winslow | ................... | H04L 9/50 |
| 2019/0385269 A1* | 12/2019 | Zachary | ................ | H04N 7/188 |
| 2020/0079319 A1* | 3/2020 | Zeryihun | ................ | B60R 21/01 |
| 2022/0012320 A1* | 1/2022 | Cornick | ................. | G06F 21/32 |

\* cited by examiner

VEHICLE COMPONENT USAGE

BACKGROUND

Vehicles include a plurality of vehicle components, e.g., seats, infotainment systems, speakers, climate control systems, etc. Each vehicle component may be provided in a variety of configurations in different vehicles. For example, a seat component could include various combinations of one or more of heated seats, cloth, leather, electrically adjustable seats, etc.

DETAILED DESCRIPTION

Figure 1:
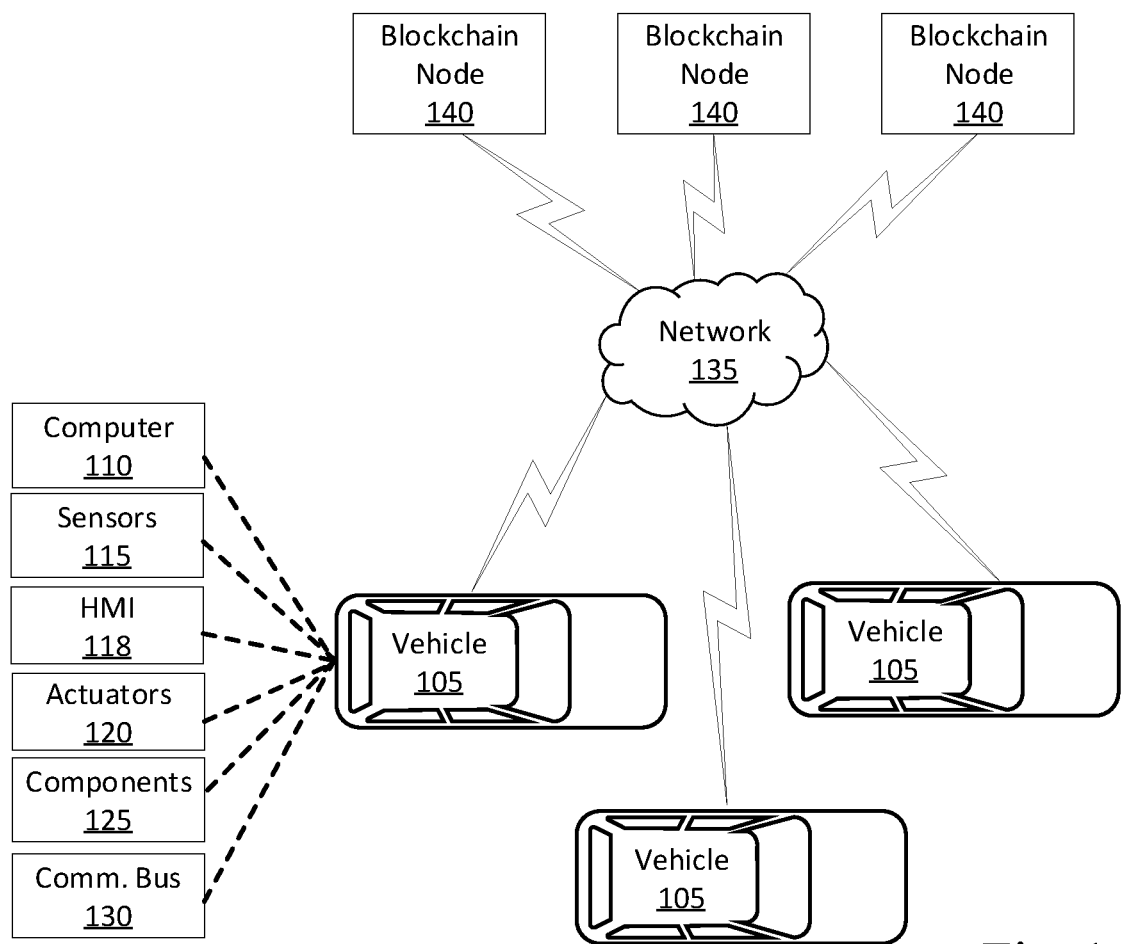
FIG. 1 is a block diagram illustrating an example system to control and monitor vehicle component usage.

A method includes receiving a first data block including an identifier for a component, receiving a second data block including usage data for the component and a link to the first data block, storing the first and second data blocks in a blockchain, and allocating respective usage tokens to each of a plurality of entities based on the usage data.

The usage data can include one or more instances of activation of the component.

The first data block can include an identifier for a vehicle.

The method can include validating a user is authorized to activate the component and activating the component when the user is authorized.

The method can include receiving usage tokens from a user based on the usage data.

The first data block can include a usage rule based on the identifier for the component.

The method can include receiving usage tokens from the user based on the usage rule.

The second data block can include an allocation rule based on the identifier for the component.

The method can include allocating the usage tokens to each of the plurality of entities based on the allocation rule.

A system can comprise a compute include a processor and a memory, the memory storing instructions executable by the processor to receive a first data block including an identifier for a component, receive a second data block including usage data and a link to the first data block, store the first and second data blocks in a blockchain, and allocate respective usage tokens to each of a plurality of entities based on the usage data.

The usage data can include one or more instances of activation of the component.

The first data block can include an identifier for a vehicle.

The instructions can further include instructions to validate a user is authorized to activate the component and to activate the component when the user is authorized.

The instructions can further include instructions to receive usage tokens from a user based on the usage data.

The first data block can include a usage rule based on the identifier for the component.

The instructions can further include instructions to receive usage tokens from the user based on the usage rule The second data block can include an allocation rule based on the identifier for the component.

The instructions can further include instructions to allocate the usage tokens to each of the plurality of entities based on the allocation rule Vehicle data can be stored as data blocks in a distributed ledger such as a vehicle blockchain component usage register. A vehicle blockchain component usage register, as discussed herein, is a database including a blockchain storing one or more data blocks storing component selection data and component usage data. The data blocks stored within the blockchain are linked in chains by hashes.

A blockchain stores data based on generation of hashes for blocks of data. A hash in the present context is a one-way encryption of data having a fixed number of bits. An example of hash encryption is SHA-256. The hashes provide links to blocks of data by identifying locations of the block of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a vehicle blockchain component usage register is discussed below in reference to FIG. 2.

FIG. 1 is a block diagrams of an example system 100 that includes one or more vehicles 105 and two or more blockchain nodes 140. Each vehicle 105 includes a vehicle computer 110 programmed to record data of the selection and usage of a feature of a vehicle component 125 in a vehicle blockchain component usage register. In this context a component "feature" is a setting of the vehicle component 125 that can be selected by user (e.g., occupant) input. Non-limiting examples of features of vehicle components 125 include heated seats, cooled seats, multi-zone climate control, heated steering wheel, auto-dimming rearview mirror, heated sides mirrors, multi-color lighting, etc.

Each vehicle 105 includes sensors 115, actuators 120, vehicle components 125, and a vehicle communications bus 130. Via a network 135, the communications bus 130 allows the vehicle computer 110 to communicate with the two or more blockchain nodes 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc.

Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The vehicle 105 further includes a human-machine interface (HMI) 118. The human-machine interface (HMI) 118 includes user input devices such as knobs, buttons, switches, pedals, levers, touchscreens, and/or microphones, etc. For example, the user may select a vehicle component 125 feature via the HMI 118, e.g., by pressing a button on the vehicle component 125, by pressing a virtual button on a touchscreen, by providing voice commands, etc. The input devices may include sensors 112 to detect user inputs and provide user input data to the vehicle computer 110. That is, the vehicle computer 110 may be programmed to receive user input to select a vehicle component 125 feature. For example, a touchscreen included in an HMI 118 may include sensors 112 to detect that a user pressed a virtual button on the touchscreen to select a vehicle component 125 feature, which input can be received in the vehicle computer 110 and used to determine the selection of the feature.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to the blockchain nodes 140 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote devices, including devices hosting blockchain nodes 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

A blockchain node 140 is a device on a peer-to-peer network that stores one copy of a blockchain. The network may support a plurality of blockchain nodes 140, as shown in FIG. 1. The blockchain nodes 140 can be hosted on conventional computing devices, i.e., including one or more processors and one or more memories, programmed to provide operations such as disclosed herein. The blockchain nodes 140 can be accessed via the network 135, e.g., the Internet or some other wide area network. Each blockchain node 140 is hosted on a computing device associated with an entity that participates in the blockchain, e.g., to verify data on the blockchain, to store data on the blockchain, etc. For example, a blockchain node 140 may be maintained by a computer associated with a manufacturer of vehicles. As another example, a blockchain node 140 may be maintained by a computer associated with an automotive supplier which manufactured the vehicle components 125 and sold them to the manufacturer of the vehicle 105.

A blockchain is a distributed electronic ledger. Each blockchain node 140 stores, e.g., in a memory, one copy of the blockchain. The blockchain nodes 140 may, for example, receive data blocks from one or more vehicle computers 110 and may upload the data blocks to the blockchain, i.e., store the respective data blocks in respective storage locations in the blockchain such that each data block is linked to one respective previous data block. Each blockchain node 140 can compare its stored blockchain data, i.e., linked data blocks, to blockchains stored by other blockchain nodes 140 to verify the data blocks. For example, each blockchain node 140 can generate a hash based on the data stored in a respective data block of a blockchain stored by another blockchain node 140. In the case the hash generated by the one blockchain node 140 matches the hash stored by the other blockchain node 140 for the respective data block, the one blockchain node 140 determines the data block is verified. The blockchain nodes 140 store, e.g., in a computer memory, usage tokens, as described below, allocated to the respective blockchain node 140. The blockchain nodes 140 can transmit usage tokens to and receive usage tokens from the vehicle computer 110 and/or other blockchain nodes 140.

The vehicle computer 110 is programmed to verify the vehicle component 125 when the vehicle computer 110 detects a vehicle component 125 feature is selected, as described above. In these circumstances, the vehicle computer 110 may be programmed to generate a first hash code and transmit the first hash code to the vehicle component 125. The vehicle component 125 may encrypt the first hash code based on a digital key to generate a challenge code and transmit the encrypted hash code to the vehicle computer 110. The vehicle computer 110 may then decrypt the encrypted hash code. In the case that the decrypted hash code matches the challenge code, the vehicle computer 110 determines that vehicle component 125 is authorized. In one example, during transmission of the encrypted hash code, or via another transmission, the vehicle component 125 may transmit an identifier of a vehicle component 125, as described below, to the vehicle computer 110. For example, the vehicle component 125 may encrypt the identifier of the vehicle component 125 with the digital key. The vehicle computer 110 may receive and decrypt the encrypted identifier of the vehicle component 125 and compare the identifier of the vehicle component 125 with a list of authorized vehicle components 125 (i.e., vehicle components 125 installed in the vehicle 105) and determine that the vehicle component 125 is an authorized vehicle component 125 (i.e., installed in the vehicle 105).

Upon validating that a user is authorized to activate the vehicle component 125 feature, the vehicle computer 110 can store, e.g., in a memory, component selection data. Component selection data is data identifying the selected vehicle component 125 of the vehicle 105. As another example, the vehicle computer 110 can transmit the component selection data to a server, e.g., via the network 135, and the server can store the component selection data. Additionally, or alternatively, the vehicle computer 110 can store component selection data in a component selection block of the blockchain, as described below. The component selection data includes an identifier of the vehicle 105, e.g., a vehicle identification number (VIN) and an identifier of the vehicle component 125. In this context, an "identifier" is an alphanumeric string of data corresponding to a specific vehicle 105 and/or vehicle component 125. In other words, the identifier identifies a specific vehicle 105 and typically also a specific vehicle component 125 in the vehicle 105.

One of the vehicle computer 110 or the blockchain nodes 140 can store, e.g., in a memory, a usage rule. In this context, a "usage rule" is a specification of a number of usage tokens (the number can be one or more) required to activate a selected vehicle component 125 feature. In the present context, a "usage token" is data that represents a number of units of an object and is transferrable on the blockchain. The unit can be, for example, a unit of currency money, e.g., 0.01 cents, 0.1 cents, 1 cent, a unit of virtual currency (or faction thereof), etc., an amount of an object, e.g., size or weight, of a raw material object, e.g., 1 gram of gold or silver, 1 foot of lumber, etc. The vehicle computer 110 can store, e.g., in a memory, usage tokens and can transmit usage tokens to one or more blockchain nodes 140. One or more usage tokens are transferred from the vehicle computer 110 to respective blockchain nodes 140 to activate a selected vehicle component 125 feature based on the usage rule.

The usage rule is typically determined by at least two entities and stored in their respective blockchain nodes 140, e.g., the manufacturer of the vehicle 105 and the supplier of the vehicle component 125. The usage rule, as stated above, specifies a predetermined number of one or more usage tokens required to activate a vehicle component 125 feature. The usage rule may, for example, be determined regardless of a duration of activation of a vehicle component 125 feature (as described below). For example, the usage rule could specify five usage tokens to activate heated seats. Alternatively, the usage rule may specify a consumption or expenditure of one or more usage tokens based on the duration of activation of the vehicle component 125 feature. In these circumstances, the usage rule may, for example, specify five usage tokens to activate heated seats for a predetermined amount of time, e.g., ten minutes, or that five tokens are expended for every ten minutes (or fraction thereof) that the component 125, e.g., seat heater, is activated. A usage rule is typically specified for a single vehicle component 125, and therefore typically includes an identifier of the vehicle component 125. For example, the usage rule may specify a different number of usage tokens to activate one vehicle component 125 feature as compared to another vehicle component 125 feature. For example, the usage rule may, for example, specify ten usage tokens to activate a multizone climate control and five usage tokens to activate heated seats. In other examples, the usage rule may specify the same number of usage tokens to activate some or all vehicle component 125 features available for activation, e.g., heated seats, heated mirrors, multizone climate control, etc.

The usage rule may be stored in a memory of a computer of at least two entities maintaining respective blockchain nodes 140, e.g., a manufacturer of the vehicle 105 and a supplier of the vehicle component 125. The respective computer of the at least two entities may, for example, host the blockchain nodes 140, i.e., store one copy of the blockchain. Alternatively, the computer storing the usage rule may be a different computer than the computer hosting the blockchain nodes 140 for the respective entities. When a vehicle component 125 feature is selected, the vehicle computer 110 may transmit the identifier of the selected vehicle component 125 to the blockchain nodes 140 and request the usage rule from the blockchain nodes 140, e.g., via the network 135. The blockchain nodes 140 may retrieve the usage rule based on the identifier of the vehicle component 125 and transmit the usage rule to the vehicle computer 110. The vehicle computer 110 can then compare the usage rule received from each blockchain node 140 to verify the usage rule. Alternatively, the usage rule may be stored, e.g., in a memory, of the vehicle computer 110. In this situation, the vehicle computer 110 can retrieve the usage rule based on the identifier of the selected vehicle component 125 when a vehicle component 125 feature is selected.

The usage rule may be accessible by the user of the vehicle 105. For example, the usage rule may be displayed to the user of the vehicle 105, e.g., on a display screen, on the vehicle component 125, in a manual, etc. The usage rule may be displayed prior to selection of a vehicle component 125 feature, after selection of the vehicle component 125 feature, or both.

One of the vehicle computer 110 or the blockchain nodes 140 may validate a user as authorized to activate the vehicle component 125 feature. For example, the blockchain nodes 140 may validate that a user is authorized to activate the vehicle component 125 feature based on the user usage tokens, i.e., the usage tokens stored in the memory of the vehicle computer 110. The vehicle computer 110 then can transmit data identifying the number of usage tokens allocated to the user, i.e., stored in a memory of the vehicle computer 110, and the blockchain nodes 140 can compare the data to the usage token(s) specified in the applicable usage rule. The blockchain nodes 140 can provide for validating a user's authorization when the user's available usage tokens meet or exceed the token(s) specified in the usage rule. Conversely, the blockchain nodes 140 serve to invalidate a user's authorization when the user usage tokens are below the token(s) specified in the usage rule. The blockchain nodes 140 can then transmit a message to the vehicle computer 110 indicating whether the user is authorized to activate the vehicle component 125 feature (e.g., a binary value representing either YES or NO). Alternatively, the vehicle computer 110 can compare the usage tokens allocated to the user to the usage token(s) specified in the applicable usage rule to determine whether the user is authorized to activate the vehicle component 125 feature.

The vehicle computer 110 may be programmed to activate the vehicle component 125 feature. For example, the vehicle computer 110 can actuate a vehicle component 125 controller to activate, i.e., turn on, the operational setting of the vehicle component 125 feature. The vehicle computer 110 may activate the vehicle component 125 feature when the user's authorization is validated. Conversely, the vehicle computer 110 may prevent activation of the vehicle component 125 feature when the user's authorization is invalidated.

Upon activating the vehicle component 125 feature, the vehicle computer 110 can store, e.g., in a memory, component usage data. As another example, the vehicle computer 110 can transmit the component usage data to a server, e.g., via the network 135, and the server can store the component usage data. Additionally, or alternatively, the vehicle computer 110 can store component usage data in a component usage block of the blockchain, as described below. Component usage data is data describing one or more instances of activation of the vehicle component 125 feature. Each instance of activation may include time data (e.g., the hour, minute, and second at which the vehicle component 125 feature is activated), date data (e.g., the calendar date when the vehicle component 125 feature is activated), and/or location data (e.g., GPS coordinates of the vehicle 105 when the vehicle component 125 feature is activated). Additionally, the usage data may include a counter that records the total number of instances the vehicle component 125 feature is activated within a specified time period (e.g., a calendar year or month, a time since last reset, etc.). Additionally, or alternatively, the component usage data includes a duration of activation of the vehicle component 125 feature. The duration is an amount of time the vehicle component 125 feature is activated. The duration is determined from the time the vehicle component 125 feature is activated until the time the vehicle component 125 feature is deactivated.

The vehicle computer 110 is programmed to determine the number of usage tokens to transmit to the respective blockchain nodes 140 based on the component usage data and the usage rule. For example, the vehicle computer 110 can determine the number of usage tokens based on each instance of activation of the vehicle component 125 feature. As another example, the vehicle computer 110 can determine the number of usage tokens based on the duration of activation. In the case that the duration of activation lasts less than the predetermined time of the usage rule, the vehicle computer 110 determines the total number of usage tokens is the number, or a fraction thereof, specified by the usage rule. In the case that the duration of the activation lasts to the predetermined amount of time, the vehicle computer 110 can determine the number of usage tokens is a multiple, e.g., 2 when the duration lasts for more than the predetermined amount of time, 1.5 when the duration lasts for half of an additional predetermined amount of time, etc., of the number of usage tokens specified by the usage rule, e.g., if continued activation is selected by the user and the number of usage tokens stored by the vehicle computer 110 equals or exceeds the number of usage tokens specified by the usage rule. Conversely, the vehicle computer 110 may deactivate the vehicle component 125 feature, e.g., if deactivation is selected by the user or if the number of usage tokens stored by the vehicle computer 110 is less than the number of usage tokens specified by the usage rule. In this situation, the vehicle computer 110 determines the total number of usage tokens is the number specified by the usage rule for the predetermined amount of time.

One of the vehicle computer 110 or the blockchain nodes 140 can store, e.g., in a memory, an allocation rule. In the present context, an "allocation rule" is a specification of numbers of usage tokens (the number can be a fraction of one, or one or more) to be distributed to each of a plurality of blockchain nodes 140 for an instance of use of a component 125. The allocation rule is typically determined by the at least two entities maintaining respective blockchain nodes 140, e.g., e.g., the manufacturer of the vehicle 105 and the supplier of the vehicle component 125. The allocation rule identifies each blockchain node 140 that receives usage tokens from the vehicle computer 110 upon the activation of a vehicle component 125 feature, e.g., the blockchain nodes 140 maintained by the manufacturer of the vehicle 105 and the supplier of the vehicle component 125, and further specifies a percentage or fraction of the token(s) allocated to each entity. For example, the allocation rule may specify that four of five usage tokens received for activation of heated seats are allocated to the supplier of the seat and the other of the five usage tokens is allocated to the manufacturer of the vehicle 105. The allocation rule typically includes a vehicle component 125 identifier, i.e., specifies a vehicle component 125 to which the allocation rule applies. An allocation rule is typically specified for a single vehicle component 125, and therefore typically includes an identifier of the vehicle component 125. For example, the allocation rule for the activation of a feature of one vehicle component 125 may be different than the allocation rule for the activation of a feature of another vehicle component 125. For example, the allocation rule for the activation of heated seats could specify that four of five usage tokens are allocated to the supplier of the seat, and the allocation rule for the activation of heated mirrors could specify that three of five usage tokens are allocated to the supplier of the mirrors. Alternatively, an allocation rule may be the same for some or all vehicle components 125.

An allocation rule may be stored in a memory of a computer of at least two entities maintaining respective blockchain nodes 140, e.g., a manufacturer of the vehicle 105 and a supplier of the vehicle component 125. The respective computer of the at least two entities may, for example, host the blockchain nodes 140, i.e., store one copy of the blockchain. Alternatively, the computer storing the allocation rule may be a different computer than the computer hosting the blockchain nodes 140 for the respective entities. The allocation rule may, for example, be stored on the same computer as the applicable usage rule. The blockchain nodes 140 retrieve the allocation rule based on the identifier of the vehicle component 125 and transmit the allocation rule to the vehicle computer 110. For example, the blockchain nodes 140 may transmit the allocation rule to the vehicle computer 110 in the same transmission as the usage rule. Alternatively, the blockchain nodes 140 may transmit the allocation rule in a different transmission, e.g., after the vehicle component 125 feature is activated. The vehicle computer 110 can then compare the allocation rule received from each blockchain node 140 to verify the allocation rule. Alternatively, the allocation rule can be stored in a memory of the vehicle computer 110. In this situation, the vehicle computer 110 can retrieve the allocation rule based on the identifier of the vehicle component 125 when a vehicle component 125 feature is activated.

The vehicle computer 110 is programmed to allocate usage tokens to each of a plurality of blockchain nodes 140 based on the applicable allocation rule. Upon activation of the vehicle component 125 feature, the vehicle computer 110 determines the total number of usage tokens to be transferred based on the usage rule and the component usage data, as described above. Upon determining the total number of usage tokens, the vehicle computer 110 allocates, i.e., assigns, the number of usage tokens specified by the allocation rule to the blockchain nodes 140 identified by the allocation rule. In other words, the vehicle computer 110 transmits the number of usage tokens specified by the allocation rule to the respective blockchain nodes 140.

Figure 2:
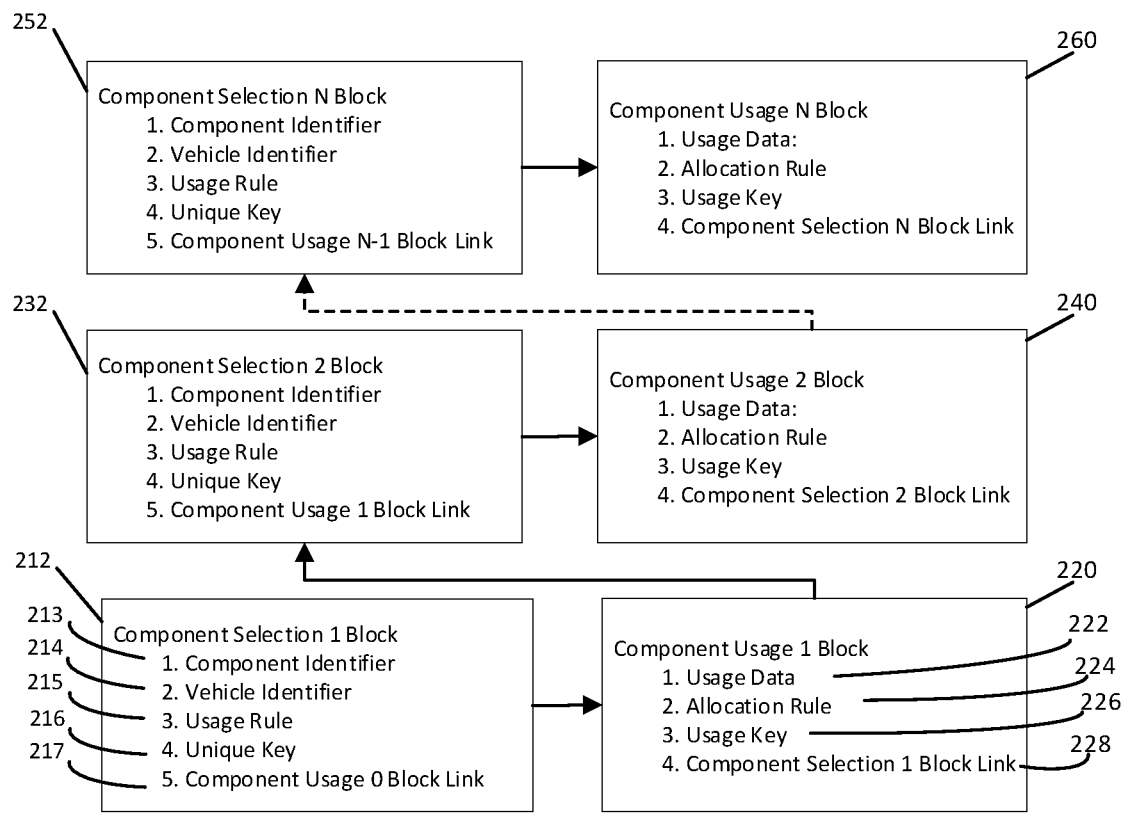
FIG. 2 is a diagram of a portion of an example vehicle blockchain component usage register.

FIG. 2 illustrates a portion of a vehicle blockchain component usage register 200 for the vehicle 105 as stored by a blockchain node 140. The vehicle blockchain component usage register 200 is a blockchain ledger that stores vehicle component 125 data. A component usage register 200 can include data for 1 to N vehicle components 125. The component usage register 200 includes a component selection block 212, 232, 252 and a component usage block 220, 240, 260.

Upon verifying the user is authorized to activate the vehicle component 125 feature, the vehicle computer 110 is programmed to initiate creation of a component selection block 212. A component selection block is a blockchain data block that stores component selection data (as described above). The vehicle computer 110 stores the component selection data to the component selection block 212. For example, the vehicle computer 110 can store one copy of the component selection data in a memory of the vehicle computer 110 and another copy of the component selection data to the component selection block 212. Alternatively, the vehicle computer 110 can generate one or more component selection addresses or links, explained further below, to access the component selection data. The vehicle computer 110 can then store the component selection addresses to the component selection block 212.

A component selection address is a link to respective component selection data that is stored in a location external to the component selection block 212. The component selection address identifies a storage location or address of the respective data, e.g., a memory of the vehicle computer 110, a central server, a memory of a computer hosting a blockchain node 140, etc., and further provides a code for verifying the respective data. The code of the component selection address may be a hash of the data to which it provides a link. The vehicle computer 110 may generate one or more component selection addresses. For example, the vehicle computer 110 may generate unique component selection addresses for the identifier of the vehicle component 125 and the identifier of the vehicle 105. In such an example, the vehicle computer 110 can generate a component identifier address 213 that identifies a storage location of the identifier of the vehicle component 125 and a vehicle identifier address 214 that identifies a storage location of the identifier of the vehicle 105. Alternatively, the vehicle computer 110 may generate a common component selection address for the identifier of the vehicle component 125 and the identifier of the vehicle 105, e.g., that identifies a common storage location of the component selection data.

The usage rule can be stored in a location external to the component selection block 212, e.g., a memory of the vehicle computer 110, a central server, a memory of a computer hosting a blockchain node 140, etc. In these circumstances, the vehicle computer 110 can generate a usage rule address 215 and can store the usage rule address 215 to the component selection block 212. The usage rule address 215 is a link that identifies the storage location or address of the usage rule and further provides a code for verifying the usage rule. The code of the usage rule address 215 may be a hash of the usage rule. Alternatively, the vehicle computer 110 can store the usage rule to the component selection block 212.

The vehicle computer 110 generates a unique key 216 and a component usage block link 217 and stores the unique key 216 and the component usage block 217 to the component selection block 212. The component usage block link 217 is a blockchain link from one blockchain data block to a most recent previous blockchain data block. In these circumstances, the component usage block link 217 is a link between the component selection block 212, 232, 252 and the most recent previous component usage block 220, 240, 260. The component usage block link 217 is a hash of the data stored in the most recent previous component usage block 220, 240, 260. The component selection 1 block 212 is an initial block in the vehicle blockchain component usage register 200, and therefore, the component usage block link 217 stored in the component selection 1 block 212 is null (i.e., no data).

The unique key 216 is an identifier of one blockchain data block, in the present example, the component selection block 212. The unique key 216 further in this example is a hash of the data stored in the component selection block 212. For example, the unique key 216 may be a hash of the component selection data, the usage rule address 215, and the component usage block link 217. As another example, the unique key 216 may be a hash of the component selection addresses 213, 214, the usage rule address 215, and the component usage block link 217.

The vehicle computer 110 transmits the component selection blocks 212, 232, 252 to the blockchain nodes 140, e.g., via the network 135. The blockchain nodes 140 then verify the component selection blocks 212, 232, 252, as described above. Upon verifying the component selection blocks 212, 232, 252, the blockchain nodes store the component selection blocks 212, 232, 252 to the blockchain, as described above.

Upon activation of the vehicle component 125 feature, the vehicle computer 110 is programmed to initiate creation of a component usage data 220. A component usage data block 220 is a blockchain data block that stores component usage data (as described above). The vehicle computer 110 can store the component usage data to the component usage block 220. For example, the vehicle computer 110 can store one copy of the component usage data in a memory of the vehicle computer 110 and another copy of the component usage data to the component usage block 220. Alternatively, the vehicle computer 110 can generate one or more component usage addresses, explained further below, to access the component usage data. The vehicle computer 110 stores the component usage addresses to the component usage block 220.

A component usage address is a link to respective component usage data that is stored in a location external to the component usage block 220. The component usage address identifies a storage location of the respective data, e.g., a memory of the vehicle computer 110, a central server, a memory of a computer hosting a blockchain node 140, etc., and further provides a code for verifying the respective data. The code of the component usage address may be a hash of the data to which it provides a link. The vehicle computer 110 may generate a usage data address 222, e.g., that identifies a common storage location of the component usage data. Alternatively, the vehicle computer 110 may generate unique component usage addresses for the respective data, e.g., time data, location data, duration data, etc.

The allocation rule can be stored in a location external to the component usage block 220, e.g., in a central server, a memory of the vehicle computer 110, a memory of a computer hosting a blockchain node 140, etc. The vehicle computer 110 can generate an allocation rule address 224 and can store the allocation rule address 224 to the component usage block 220. The allocation rule address 22 is a link that identifies the storage location or address of the allocation rule and further provides a code for verifying the allocation rule. The code of the allocation rule address 224 may be a hash of the allocation rule. Alternatively, the vehicle computer 110 can store the allocation rule to the component usage block 220.

The vehicle computer 110 generates a usage key 226 and a component selection block link 228 and stores the usage key 226 and the component selection block link 228 to the component usage block 220. The component selection block link 228 is a blockchain link from one blockchain data block to a most recent previous blockchain data block. The component selection block link 228 in the present example is a link between the component usage block 220, 240, 260 and the most recent previous component selection block 212, 232, 252. The component selection block link 228 is a hash of the data stored in the most recent previous component selection block 212, 232, 242.

The usage key 226 is an identifier of one blockchain data block. The usage key 226 in the present example is an identifier of the component usage block 220. The usage key 226 is a hash of the data stored in the component usage block 220. For example, the usage key 226 may be a hash of the component usage data, the allocation rule address 224, and the component selection block link 228. As another example, the usage key 226 may be a hash of the usage data address 222, the allocation rule address 224, and the component selection block link 228.

The vehicle computer 110 transmits the component usage blocks 220, 240, 260 to the blockchain nodes 140, e.g., via the network 135. The blockchain nodes 140 then verify the component usage blocks 220, 240, 260, as described above. Upon verifying the component usage blocks 220, 240, 260, the blockchain nodes store the component usage blocks 220, 240, 260 to the blockchain, as described above.

Figure 3:
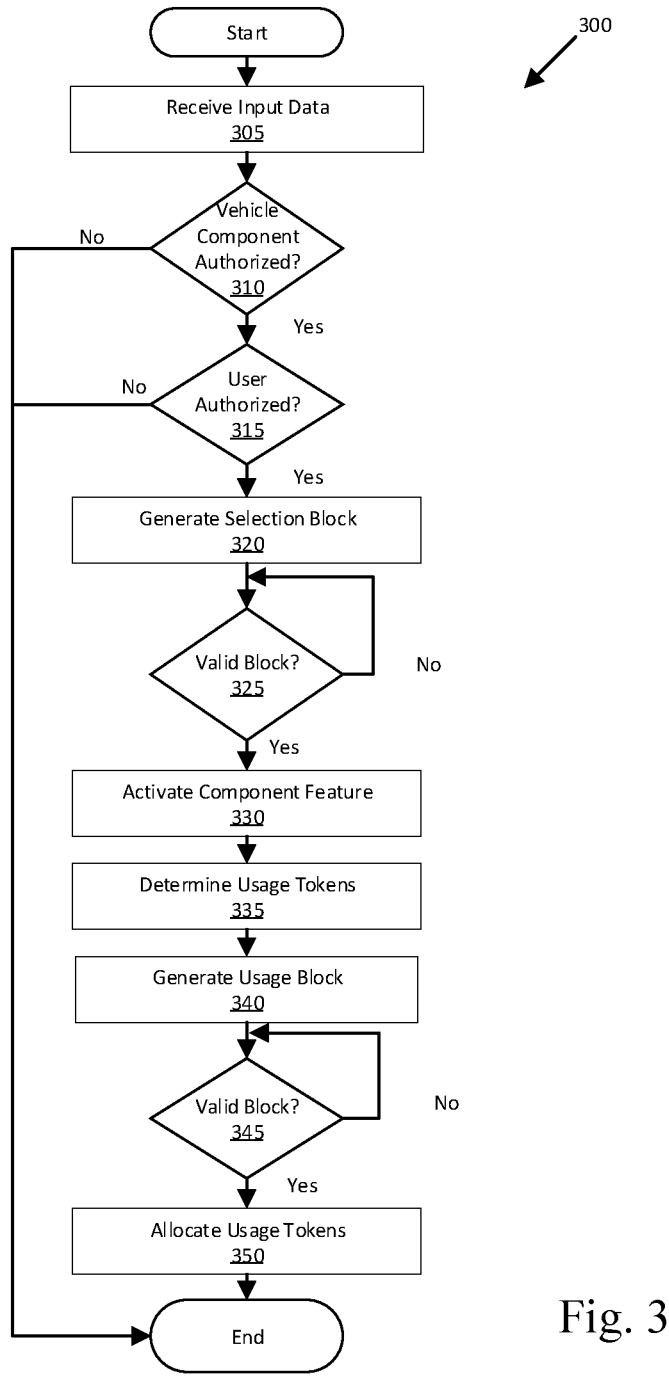
FIG. 3 is a flowchart of an example process for updating a blockchain vehicle blockchain component usage register.

FIG. 3 illustrates an example process 300 for updating a blockchain upon activation of a vehicle component 125 feature. The process 300 starts in a block 305.

In the block 305, the vehicle computer 110 receives input data from the HMI 118. For example, the HMI 118 may detect that a user has pressed a button, e.g., a physical button on the vehicle component 125, a virtual button a touchscreen, etc., to select a vehicle component 125 feature. As another example, the HMI 118 can detect voice commands from the user, e.g., via a microphone in the vehicle 105, selecting a vehicle component 125 feature. The HMI 118 transmits the input data to the vehicle computer 110. The input data includes the identifier of the vehicle component 125. That is, the input data identifies the selected vehicle component 125. The process 300 continues in a block 310.

In the block 310, in response to receiving the input data from the HMI 118, the vehicle computer 110 determines whether the vehicle component 125 is an authorized vehicle component 125. For example, the vehicle computer 110 may generate and transmit a challenge hash to the vehicle component 125. The vehicle component 125 then responds to the vehicle computer 110. For example, the vehicle component 125 may encrypt, e.g., based on a first digital key, the challenge hash received from the vehicle computer 110 and/or may encrypt the identifier of the vehicle component 125 and may transmit the encrypted challenge hash and/or encrypted identifier of the vehicle component 125 to the vehicle computer 110.

The vehicle computer 110 then decrypts, e.g., based on a second digital key, the encrypted challenge hash and encrypted identifier of the vehicle component 125. In the case that the vehicle component 125 is an authorized vehicle component 125 for the vehicle 105, the first digital key and second digital key may correspond such that data encrypted by the first digital key can be decrypted and recovered with the second digital key. The vehicle computer 110 then compares the decrypted hash to the challenge hash. In the case that the decrypted hash matches the challenge hash, the vehicle computer 110 determines that the vehicle component 125 is an authorized vehicle component 125. Alternatively or additionally, the vehicle computer 110 may compare the decrypted identifier for the vehicle component 125 with a list of authorized vehicle components 125, and, upon identifying a match, determine that the vehicle component 125 is an authorized device. In the case that the vehicle computer 110 determines that the vehicle component 125 is an authorized device, the process 300 continues in a block 315. Otherwise, the process 300 ends.

In the block 315, the blockchain nodes 140 validate that the user is authorized to activate the vehicle component 125 feature. For example, the vehicle computer 110 can transmit data identifying a number of usage tokens stored in a memory of the vehicle computer 110 to the blockchain nodes 140. The blockchain nodes 140 then compare the number of usage tokens to an applicable usage rule. The applicable usage rule may be determined based on the identifier of the vehicle component 125. As one example, the respective computers of the blockchain nodes 140 may store one or more usage rules. The vehicle computer 110 can then transmit the identifier of the vehicle component 125 to the blockchain nodes 140, and the computers of the blockchain nodes 140 can determine the applicable usage rule based on the identifier of the vehicle component 125.

As another example, the vehicle computer 110 may store one or more usage rules. The vehicle computer 110 can then determine the applicable usage rule based on the identifier of the vehicle component 125 and transmit the usage rule to the blockchain nodes 140. In the case that the number of usage tokens exceed the usage rule, the blockchain nodes 140 determine that the user is authorized to activate the vehicle component 125 feature. The blockchain nodes 140 may validate the user is authorized to activate the vehicle component 125 feature according to a consensus protocol, i.e., a majority of the blockchain nodes 140 determine the user is authorized to activate the vehicle component 125 feature. Alternatively, the vehicle computer 110 can validate the user is authorized to activate the vehicle component 125 feature. In the case that one of the vehicle computer 110 or the blockchain nodes 140 validate the user is authorized to activate the vehicle component 125 feature, the process 300 continues in a block 320. Otherwise the process 300 ends.

In the block 320, the vehicle computer 110 generates a component selection N block to store the component selection N data. N is an integer 1 or greater. A component selection N block is a current and Nth component selection block for which data is being stored in the vehicle blockchain component usage register 200. Component selection N data is data uniquely identifying the Nth component selection. The component selection N data and/or the usage rule may be stored in a location external to the component selection N block, e.g., in a memory of the vehicle computer 110, a central server, a memory of a computer hosting a blockchain node 140, etc. In this situation, the vehicle computer 110 may generate a component identifier address 213, a vehicle identifier address 214, and a usage rule address 215 that link to the respective data. In this situation, the vehicle computer 110 stores the addresses 213, 214, 215 in the component selection N block. Alternatively, the vehicle computer 110 may store the component selection N data and/or the usage rule in the component selection N block.

Additionally, the vehicle computer generates a component usage N−1 block link 217 and a unique key 216. The vehicle computer 110 then stores the component usage N−1 block link 217 and the unique key 216 to the component selection N block. The vehicle computer 110 then transmits the component selection N block to the blockchain nodes 140. The process 300 continues in a block 325.

In the block 325, the blockchain nodes 140 determine whether the component selection N block is valid. Upon receiving the component selection N block from the vehicle computer 110, the blockchain nodes 140 may generate a hash of the data stored in the most recent previous data block, i.e., the component usage N−1 block. In the case that the generated hash matches the component usage N−1 block link of the component selection N block, the blockchain nodes 140 determine that the component selection N block is valid. When the blockchain nodes 140 determine the component selection N block is valid, the blockchain nodes 140 store the component selection N block to the blockchain, i.e., store the component selection N block in a designated memory location, and the process 300 continues in a block 330. Otherwise the process 300 remains in the block 325.

In the block 330, the vehicle computer 110 activates the vehicle component 125 feature. For example, upon verifying the component selection N block, the blockchain nodes 140 can transmit a message to the vehicle computer 110, e.g., authorizing the activation of the vehicle component 125 feature. Upon receiving the authorization from the blockchain nodes 140, the vehicle computer 110 may actuate a controller of the vehicle component 125 to turn on the operational setting of the vehicle component 125 feature (e.g., activate heated seats). The process 300 continues in a block 335.

In the block 335, the vehicle computer 110 determines the number of usage tokens based on the usage data and the usage rule. For example, the vehicle computer 110 can determine the number of usage tokens based on each instance of activation of the vehicle component 125 feature. Alternatively, the vehicle computer 110 can determine the number of usage tokens based on a duration of activation of the vehicle component 125 feature. In this situation, the vehicle computer 110 compares the duration of activation of the vehicle component 125 feature to a predetermined time specified by the usage rule, as described above. The process 300 continues in a block 340.

In the block 340, the vehicle computer 110 generates a component usage N block to store the component usage N data. N is an integer 1 or greater. Component usage N block is a current and Nth component usage block for which data is being stored in the vehicle blockchain component usage register 200. Component usage N data is data uniquely identifying the Nth instance of activation of the vehicle component 125 feature. The component usage N data and/or the allocation rule may be stored in a location external to the component usage N block, e.g., in a memory of the vehicle computer 110, a central server, a memory of a computer hosting a blockchain node 140, etc. In this situation, the vehicle computer 110 may generate a usage data address 222 and an allocation rule address 224 that link to the respective data. In this situation, the vehicle computer 110 stores the addresses 222, 224 in the component usage N block. Alternatively, the vehicle computer 110 may store the component usage N data and/or the allocation rule in the component selection N block.

Additionally, the vehicle computer 110 generates a component selection N block link 228 and a usage key 226. The vehicle computer 110 stores the component selection N block link 228 and the usage key 226 to the component usage N block. The vehicle computer 110 then transmits the component usage N block to the blockchain nodes 140. The process 300 continues in a block 345.

In the block 345, the blockchain nodes 140 determines whether the component usage N block is valid. Upon receiving the component usage N block from the vehicle computer 110, the blockchain nodes 140 may generate a hash of the data stored in the most recent previous data block, i.e., the component selection N block. In the case that the generated hash matches the component selection N link of the component usage N block, the blockchain nodes 140 determine the component usage N block is valid. When the blockchain nodes 140 determine the component usage N block is valid, the blockchain nodes 140 upload the component usage N block to the blockchain, i.e., store the component usage N block in a designated memory location, and the process 300 continues in a block 350. Otherwise the process 300 remains in the block 345.

In the block 350, the vehicle computer 110 allocates, i.e., assigns, usage tokens to the blockchain nodes 140 based on an applicable allocation rule. The applicable allocation rule may be determined based on the identifier of the vehicle component 125. In this situation, the vehicle computer 110 may store one or more allocation rules, e.g., in a memory. In these circumstances, the vehicle computer 110 can determine the allocation rule based on the identifier of the vehicle component 125. Alternatively, the blockchain nodes 140 may store one or more allocation rules, e.g., in a memory of a respective computer, and may determine the allocation rule based on the identifier of the vehicle component 125, which is transmitted by the vehicle computer 110 to the blockchain nodes 140. In this situation, the blockchain nodes 140 transmit the allocation rule to the vehicle computer 110. The vehicle computer 110 reduces the number of usage tokens stored in the memory of the vehicle computer 110 based on the number of usage tokens determined in block 430 above and transmits a portion of the determined number of usage tokens to each of a plurality of identified blockchain nodes 140 based on the allocation rule. The process 300 ends after block 350.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
   receiving a first data block including an identifier for a component;
   receiving a second data block including usage data for the component and a link to the first data block;
   storing the first and second data blocks in a blockchain; and
   allocating respective usage tokens specified for activation of the component, to each of a plurality of entities based on the usage data, to respective entities that are external to the vehicle that receive usage token allocations at nodes of the blockchain hosted at respective entity computers.

2. The method of claim 1, wherein the usage data includes one or more instances of activation of the component.

3. The method of claim 1, wherein the first data block includes an identifier for a vehicle.

4. The method of claim 1, further comprising validating a user is authorized to activate the component and activating the component when the user is authorized.

5. The method of claim 1, further comprising receiving usage tokens from a user based on the usage data.

6. The method of claim 5, wherein the first data block includes a usage rule based on the identifier for the component.

7. The method of claim 6, further comprising receiving usage tokens from the user based on the usage rule.

8. The method of claim 1, wherein the second data block includes an allocation rule based on the identifier for the component.

9. The method of claim 8, further comprising allocating the usage tokens to each of the plurality of entities based on the allocation rule.

10. A system, comprising a computer including a processor and a memory, the memory storing instructions executable by the processor to:
    receive a first data block including an identifier for a component;
    receive a second data block including usage data and a link to the first data block;
    store the first and second data blocks in a blockchain; and
    allocate respective usage tokens specified for activation of the component, to each of a plurality of entities based on the usage data, to respective entities that are external to the vehicle that receive usage token allocations at nodes of the blockchain hosted at respective entity computers.

11. The system of claim 10, wherein usage data includes one or more instances of activation of the component.

12. The system of claim 10, wherein the first data block includes an identifier for a vehicle.

13. The system of claim 10, wherein the instructions further include instructions to validate a user is authorized to activate the component and to activate the component when the user is authorized.

14. The system of claim 10, wherein the instructions further include instructions to receive usage tokens from a user based on the usage data.

15. The system of claim 14, wherein the first data block includes a usage rule based on the identifier for the component.

16. The system of claim 15, wherein the instructions further include instructions to receive usage tokens from the user based on the usage rule.

17. The system of claim 10, wherein the second data block includes an allocation rule based on the identifier for the component.

18. The system of claim 17, wherein the instructions further include instructions to allocate the usage tokens to each of the plurality of entities based on the allocation rule.

* * * * *